United States Patent [19]
Steinrück et al.

[11] Patent Number: 5,634,492
[45] Date of Patent: Jun. 3, 1997

[54] COMPRESSOR VALVE LIFTER

[75] Inventors: Peter Steinrück; Peter Rochowansky; Karl Rein, all of Vienna, Austria

[73] Assignee: Hoerbiger Ventilwerke Aktiengesellschaft, Vienna, Austria

[21] Appl. No.: 435,783

[22] Filed: May 5, 1995

[30] Foreign Application Priority Data

May 11, 1994 [AT] Austria ................... 988/94

[51] Int. Cl.$^6$ ................................. F16K 15/18
[52] U.S. Cl. ............................ 137/522; 137/512.1
[58] Field of Search ........................ 137/522, 512.1, 137/516.13, 516.15

[56] References Cited

U.S. PATENT DOCUMENTS

| | | | |
|---|---|---|---|
| 4,869,289 | 9/1989 | Hrabal | 137/512.1 |
| 5,025,830 | 6/1991 | Kursar | 137/522 |
| 5,378,117 | 1/1995 | Bennitt | 137/522 X |

FOREIGN PATENT DOCUMENTS 0314665  5/1989  European Pat. Off. ........ 137/522

*Primary Examiner*—Hoang Nguyen
*Attorney, Agent, or Firm*—Watson Cole Stevens Davis, P.L.L.C.

[57] ABSTRACT

A valve lifter for compressor valves includes a carrier, and a plurality of fingers secured thereto, the fingers including a retaining element co-operating with the carrier so as to provide a positive fit. At least one retaining element incorporates a positioning element that established its position relative to the carrier, and a fixing element that snaps into position in the installation position on the carrier. It is preferred that the fingers be of long glass fiber reinforced polyamide, which permits a simple and secure connection of the fingers to the carrier that does not settle.

10 Claims, 3 Drawing Sheets

COMPRESSOR VALVE LIFTER

FIELD OF THE INVENTION

This invention relates to a compressor valve lifter of the type that includes a carrier with a plurality of fingers attached thereto.

PRIOR ART

Numerous versions of valve lifters of this kind are known. They are used to control the flow in automatic plate valves used for compressors and the like. The lifter, whose fingers fit into the valve opening area of the valve seat plate of the inlet valve, is acted upon by an adjustable bias force, in most cases applied by a spring, which keeps the plate valve open so that this, and thus the inlet valve, remains open for a specific portion of the compression stroke of the piston. This means that some of the contents of the cylinder are not compressed, but are forced back into the induction manifold.

In this connection, embodiments in which the fingers are manufactured in one piece with the carrier or which are welded thereto during manufacture are known. Recently, embodiments have also become known for dry-running applications in which, for a variety of reasons, it is not possible to provide lubrication. In these embodiments, plastic fingers manufactured from solid blanks are bolted to a carrier that, for reasons of strength, is of steel or cast iron.

All of the known embodiments are relatively complicated and thus costly to manufacture, and in the case of the last named embodiment, there is an additional disadvantage that the screw-type attachment is relatively vulnerable to settling or loosening during operation so that additional steps have to be taken to secure them.

SUMMARY OF THE INVENTION

It is an object of the present invention to improve a lifter of the type described in the introduction hereto that avoids the advantages associated with the known embodiments, and in that, in particular, it is possible to achieve secure attachment of the fingers in a manner that is simple from the standpoint of construction and also cost-effective.

According to the present invention the fingers of the lifter are provided at the end closest to the carrier with a retaining element that makes a positive fit with the carrier. This retaining element has at least one positioning element that fixes its position relative to the carrier and a fixing element that snaps to the carrier in the assembly position. Thus, a type of snap connection is created between the fingers and the carrier and the security of the relative position of the two elements to each other can be optimized largely independently of the attachment. This means that assembly of the lifter is very simple. In addition, the fixing element that snaps onto the carrier either directly or indirectly through a closing element or the like can also help to prevent settling or loosening of the connection in a reliable manner.

In a further embodiment of the present invention, the carrier has carrier arms arranged in the shape of a star around a central hub. The carrier arms incorporate bores for the attachment of the fingers, as are used, for example, in a screw-type connection described heretofore. Provision is made such that the retaining elements fit at least in part directly into the bores of the carrier arms. This makes it particularly simple to manufacture the carrier.

In a further embodiment of the present invention, at least one fixing element on each retaining element can be formed as a catch that can move elastically, transversely to the longitudinal dimension of the fingers, which in the fixed state of the fingers is preferably snapped onto the opposite edge of the bore of the carrier arm. This permits a particularly simple configuration of the fixing element that can work in conjunction with a simple continuous bore in the carrier. On the other hand, in the fixed state of the fingers, the moveable catch can also snap onto an elastic annular element that is arranged on the opposite edge of the bore in the carrier arm. This annular element is in the form of a round-wire snap ring, which permits simple matching to various requirements and, in particular, a reduction of the dimensions of the retaining element.

In a further preferred embodiment of the present invention, at least two opposing positioning elements on each retaining element rest from the inside on the continuous bore in the carrier arm, whereby the relative position of the two parts to each other can be firmly established in a configuration that is of simple design.

According to a further development of the present invention, provision is made such that at least two opposing positioning elements on each retaining element rest from the outside on the side surfaces of the particular carrier arm. This configuration, too, permits establishment of the relative position of the two parts to each other using simple construction means, when, of course, if required, a combination with the above-described relative positioning means can also be provided.

In a particularly preferred additional configuration of the present invention, the carrier is of metallic material, preferably steel, and each of the fingers are of plastic, preferably reinforced by glass fiber. The glass fiber reinforced fingers that are of plastic can be mass produced simply and inexpensively since this material not only has sufficient strength for demanding use but also, by virtue of special shaping, also has the required elasticity for the snap connection.

In another configuration of the present invention, each of the fingers can be of long glass fiber reinforced polyamide and, with respect to its particular cross-sectional shape, can be such that the reinforcing fibers lie in the direction of the particular critical loading, during spraying, which results in additional resistance to deformation transversely to the axis of the finger. In addition, the particular cross-section can be so configured, using ribs or the like, that its stiffness is significantly increased, and the optimal orientation of the glass fibers is ensured during spraying.

In a further configuration of the present invention, a positioning mark can be provided on the retaining element of each finger; using this, it is simple to ensure that the fingers, which are appropriately curved and are mostly matched, at least approximately, to the slot-like flow openings of the valve plate, which lie on an arc of a circle, are correctly installed so as not to inhibit the proper functioning of the lifter.

BRIEF DESCRIPTION OF THE DRAWINGS

The present invention will now be described in more detail, by way of example only, with reference to the accompanying drawings, in which.

DESCRIPTION OF THE PREFERRED EMBODIMENTS

Figure 1:
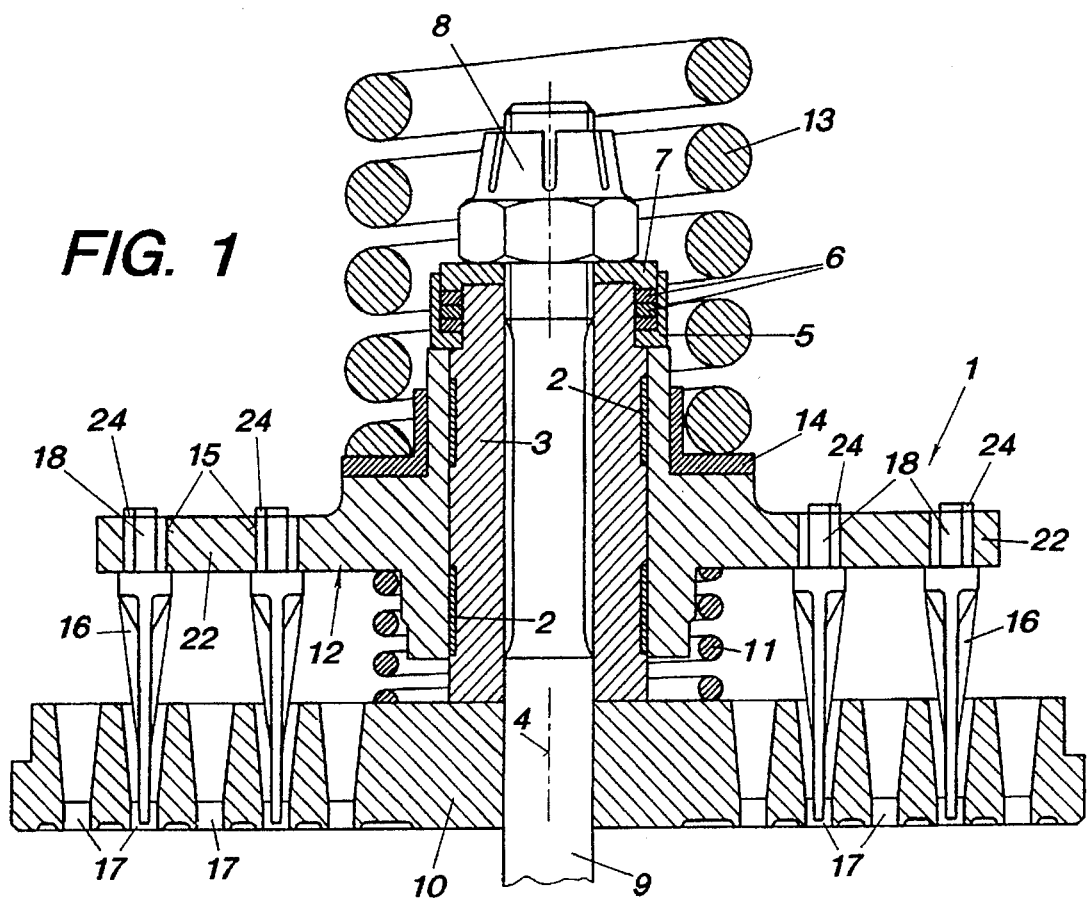
FIG. 1 is a cross-section through a valve lifter and its immediate surroundings when installed.

The valve lifter shown in FIG. 1 can move on a guide sleeve 3 fitted with slide rings 2 along the axis of the valve 4. In this illustration, the upper stop is formed by a stop ring 5 that rests through damping elements 6 on a disk 7. In its turn, the disk 7 is tightened down with the complete suction valve by means of a securing nut 8 and a necked-down bolt 9 of which only the seat plate 10 can be seen. In this illustration, the lowest stop of the valve lifter is formed by the upper side of the seat plate 10 itself.

A spring 11 installed between the upper side of the seat plate 10 and the lower side of the carrier 12 of the lifter 1 acts towards the upper stop, in which the lifter 1 is not operative. From above, a compression spring 13 rests on the carrier 12 of the lifter 1 through a ring piece 14, and an adjustable bias force to control the lift of the suction valve can be applied by this.

Figure 2:
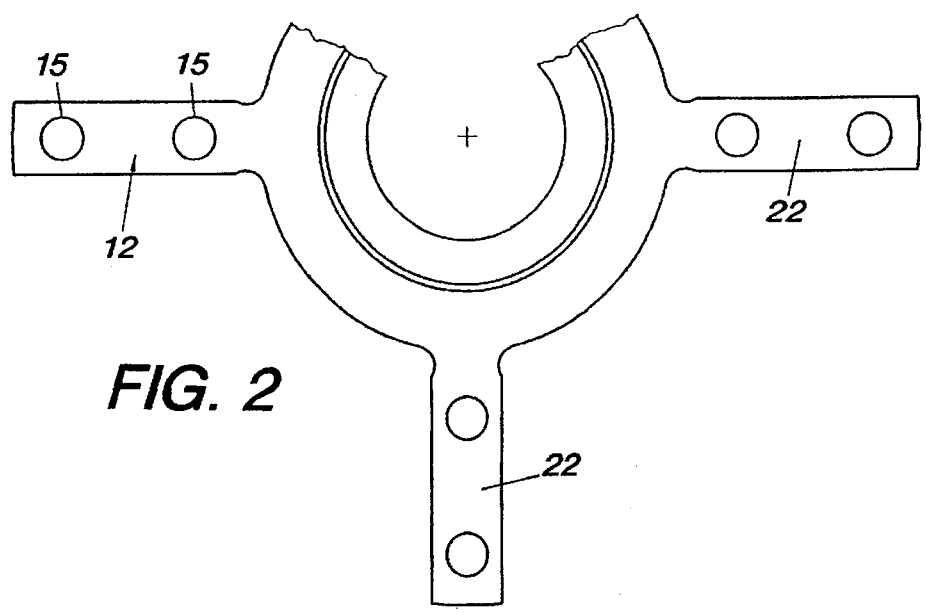
FIG. 2 is a view similar to FIG. 1, at somewhat greater scale, of the carrier for the lifter, as viewed from above.

Fingers 16 are secured in continuous bores 15 in the carrier 12 which, in FIG. 2, is star-shaped. These fingers 16 fit into a part of the flow openings 17 of the seat plate 10. When an appropriate force acts on the lifter through the spring 13, they act on the valve plate (not shown herein). This causes the closing of the suction valve to be delayed under control so that the output from the compressor can be regulated.

The fingers 16 are provided on their ends that face the carrier 12 with a retaining element 18 that forms a positive fit in the carrier 12. This has positioning elements 19, 20 that establish the relative position with respect to the carrier 12 as well as to fixing elements 21 that snap onto the carrier 12 in the assembly position (see FIGS. 3 to 6).

As can be seen from FIG. 1, the retaining elements 18 engage directly into the continuous bores 15 in the carrier arms 22. The fixing elements 21 on each retaining element 18, configured here as catches 23, can move elastically transversely to the longitudinal dimension of the fingers 16. In the fixed state of the fingers 16, these are snapped onto the opposite edge of the bore 15 of the carrier arm 22.

The two opposing positioning elements 20 (see FIG. 6) on each retaining element 18 are supported from the inside on the continuous bore 15 of the carrier arm 22. The similarly opposite and additional positioning elements 19 (see FIG. 6) on each retaining element 18 are supported from the outside on the side surfaces of the particular carrier arm 22. Thus, when the fingers are snapped in, this results in a clear fixing of the position relative to the carrier arm 22. By using the positioning marks (see FIG. 6 and FIG. 1), it can be easily ascertained that the fingers have been installed so as to match the curvature of the slot-like passage opening 17 of the seat plate 10 (not shown further herein) with references to the curvature that can be seen in FIG. 5.

Figure 3:
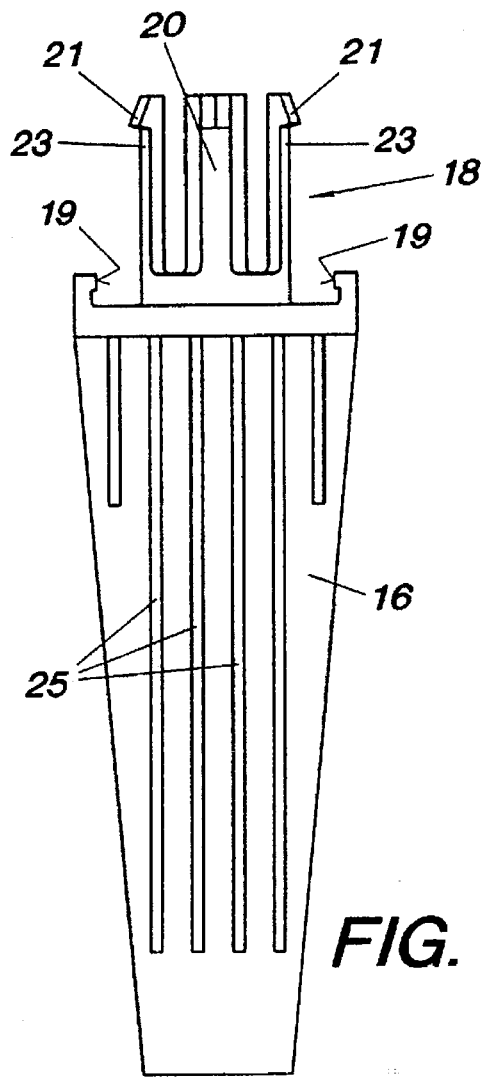
FIGS. 3 to 6 show various views or cross-sections of a finger at an enlarged scale.
Figure 4:
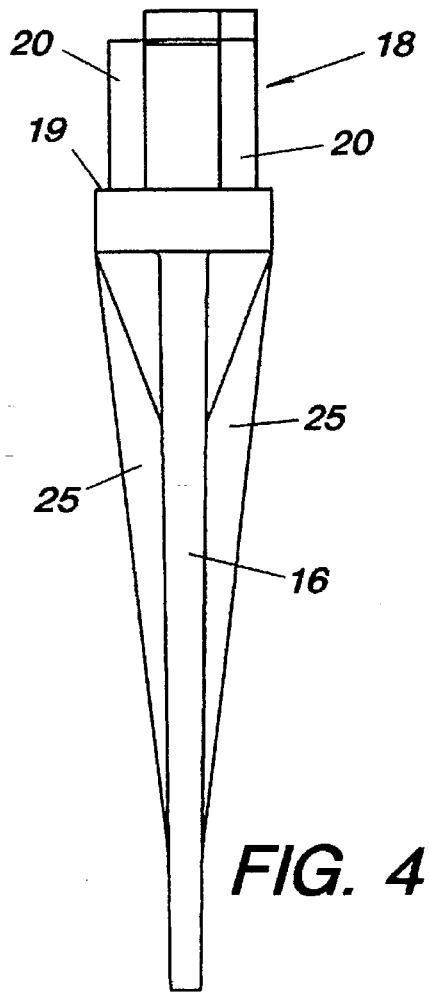
Figure 5:
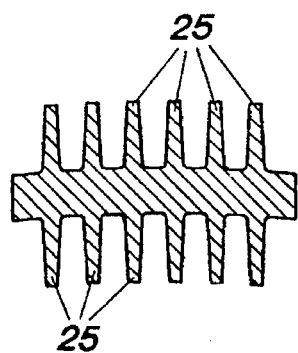
Figure 6:
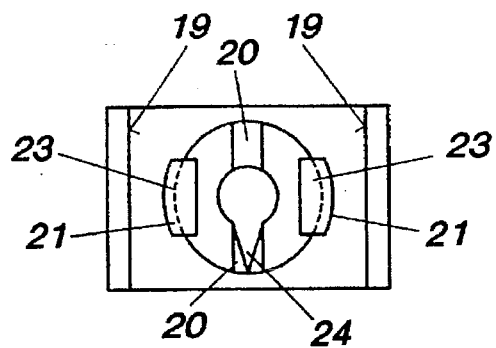

The carrier 12 is of metallic material, for example, milled or laser-cut steel. Each of the fingers 16 is of a long glass fiber reinforced polyamide, and with respect to its particular cross-sectional shape, as can be seen from FIGS. 3, 4, and 5, is so designed that the reinforcing fibers lie transversely to the direction of the particular critical load during the spraying process. As can be seen from FIG. 1, this naturally acts to cause the fingers 16 to buckle out, so that here the reinforcing fibers preferably have to lie in the longitudinal extension of the fingers 16. This is ensured, particularly, by the ribs 25, which provide the cross-section that is required for the load-carrying capacity of the fingers 16 without permitting the reinforcing glass fibers to be in a random arrangement that is less favorable from the standpoint of strength.

Figure 7:
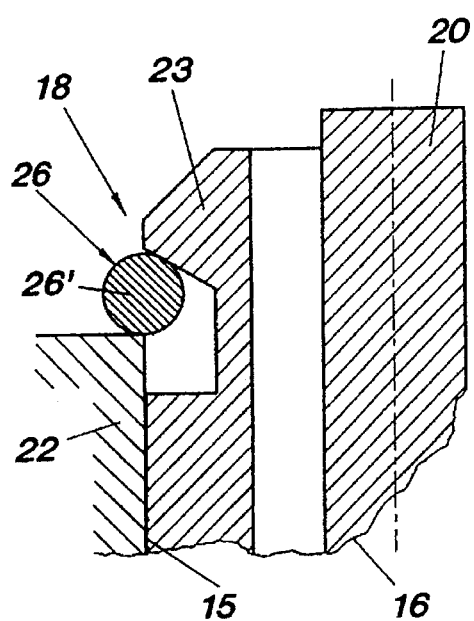
FIGS. 7 and 8 show other embodiments in accordance with the present invention with details of the retaining elements that work in conjunction with the carrier, at greater scale.

As can be seen from FIG. 7, in the fixed state of the fingers 16 the or each moveable catch 23 is snapped on a round-wire snap ring 26' that is arranged on the opposite edge of the bore 15 in the carrier arm 22. This has the advantage that the maximal outside diameter of the retaining element 18 need not extend beyond the diameter of the bore 15 and, altogether, can be kept smaller than, for example, the embodiments described heretofore, since the snap ring 26' that has to be enlarged elastically renders any special or additional elastic deformability of the catch 23 towards the middle superfluous.

Figure 8:
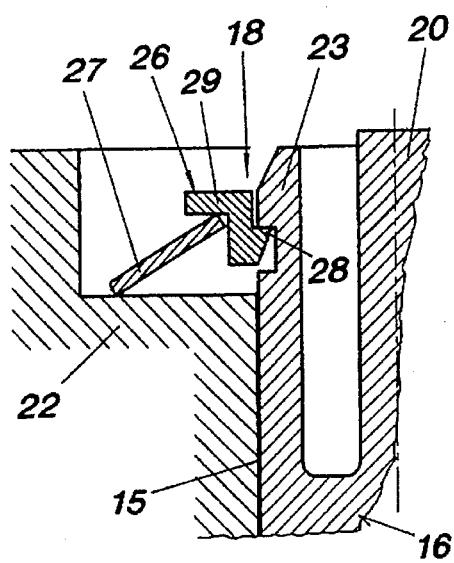

In the embodiment shown in FIG. 8 the elastic ring element 26 that is provided for snapping in the catch(es) 23 is made in two parts, in contrast to the one shown in FIG. 7, and a disk spring 27 is arranged in a recess in the carrier arm 22 and presses a supporting ring 29 that has snap lugs 28 upwards which means that the fingers 16 are securely fixed in the bore 15 of the carrier arm 22.

Figure 9:
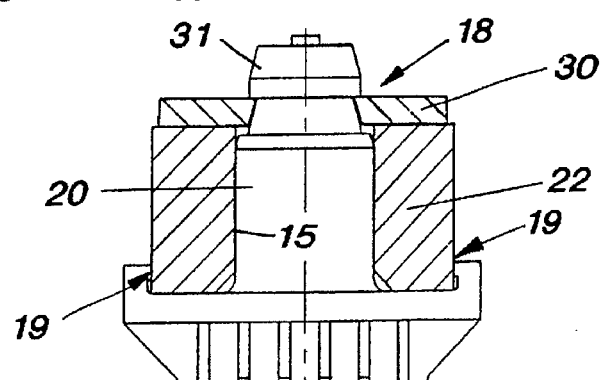
FIG. 9 shows another embodiment of a finger for a lifter according to the present invention, this being shown in cross-section through its installed position.
Figure 9:
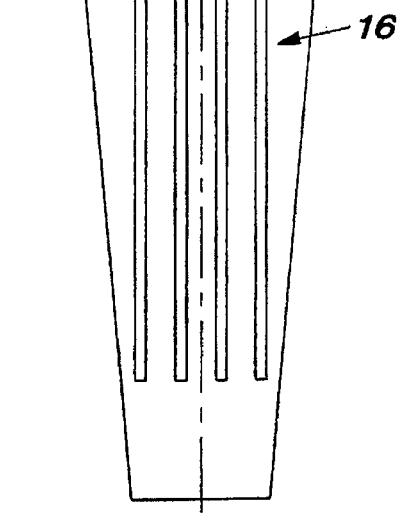

In the embodiment shown in FIG. 9, the finger 16 is once again inserted into the carrier arm 22 or into the bore 15 therein from below and secured by the positioning elements 19, 20 into its position relative to the carrier. Here, an elastic disk 30 of plastic of the like serves as the retaining element 18, and this is snapped onto a necked-down stud section 31 at the end of the finger 16. The stud section 31 can be made in one piece during production of the finger 16, when it can, for example, be manufactured in one piece by spraying on plastic. The disk 30 has the additional task of compensating for the free play that is generated as a result of temperature changes between the finger 16 and the supporting arm 22.

Plastic that has a considerably greater coefficient of expansion than the finger 16 itself can also be used for the disk 30. The thickness of the disk 30 is so selected that a close fit without any free play is ensured throughout the whole temperature range and, additionally, pretensioning can be achieved by way of a disk-like shape of the unloaded disk 30 (not shown herein), which also compensates for manufacturing tolerances and the like.

Regardless of the embodiments that have been discussed and illustrated herein, the fixing element could, for example, be made in the form of individual lugs or ring segments that, at the upper edge, have the shape of a deformable hollow cylinder which, on being pushed through an appropriate bore in the carrier, are first compressed and then held securely on the edge of the bore when they snap outwards. In addition, various disk spring designs are possible which could be of plastic.

The embodiment that has been shown and discussed herein, according to the present invention, results in a reduction of costs when the fingers 16 are manufactured and when the whole valve lifter 1 is assembled because the connection between the finger 16 and the carrier 12 is simple and does not settle. The snap design permits simple and secure attachment, and the catch-like fixing elements 21 compensate for the different elongations that are caused by temperature and manufacturing tolerances.

We claim:

1. A valve lifter for compressor valves, comprising a carrier having a central hub and arms extending away from said central hub, said arms including a plurality of continuous bores extending therethrough, and a plurality of fingers for attachment to said carrier, each of said fingers including a retaining element which can at least partially fit within a respective continuous bore of an arm of said carrier, said retaining element including a positioning element for contacting the carrier and positioning the retaining element relative to the carrier, and a fixing means for snap-fit locking of the finger to the carrier.

2. A valve lifter as claimed in claim 1, wherein each bore has opposite first and second edges, wherein each retaining element extends into a bore through a first edge thereof, and wherein at least one said fixing means is formed on each said retaining element as a movable catch that can move elastically and transversely relative to a longitudinal direction of the finger and which, in a fixed state of the finger, is snapped onto said second edge of the bore of the carrier arm in which the retaining element extends.

3. A valve lifter as claimed in claim 1, including an elastic ring element, and wherein each said returning element includes at least one said fixing means formed as a movable catch that can move elastically and transversely relative to a longitudinal direction of the finger and which, in a fixed state of the finger is snapped against said elastic ring element.

4. A valve lifter as claimed in claim 3, each bore has opposite first and second edges, and wherein said elastic ring element is a round-wire snap ring located at said second edge of the bore of the carrier arm in which the retaining element extends.

5. A valve lifter as claimed in claim 1 wherein at least two opposing said positioning elements rest on each said retaining element from the inside, on the continuous bore of the carrier arm.

6. A valve lifter as claimed in claim 1, wherein at least two opposing said positioning elements rest on each retaining element from the outside, on side surfaces of each carrier arm.

7. A valve lifter as claimed in claim 1, wherein the carrier is of metallic material, and each of the fingers is of plastic.

8. A valve lifter as claimed in claim 7, wherein each said finger is of long glass fiber reinforced polyamide and with respect to its particular cross-sectional shape is so designed that the reinforcing fibers lie in the direction of the critical load during spraying.

9. A valve lifter as claimed in claim 1, wherein the carrier is of steel, and each of the fingers is of glass fiber reinforced plastic.

10. A valve lifter as claimed in claim 1, wherein a positioning mark is provided on the retaining element of each finger.

* * * * *